Figure 1:
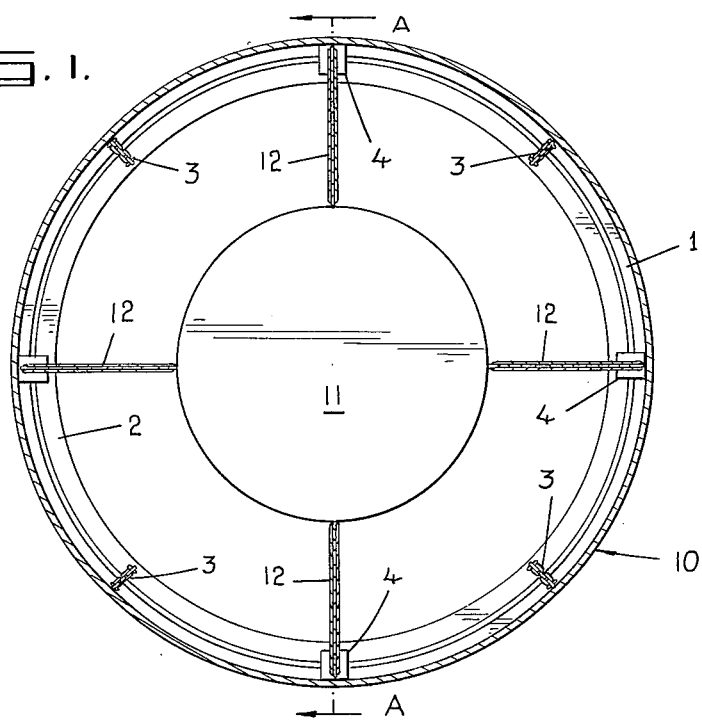

United States Patent [19]
Potter

[11] 4,091,678
[45] May 30, 1978

[54] PIPELINE LIMIT DENT DETECTOR

[75] Inventor: David Walter Potter, West Hill, Canada

[73] Assignee: Trans Canada Pipelines Limited, Toronto, Canada

[21] Appl. No.: 793,771

[22] Filed: May 4, 1977

[30] Foreign Application Priority Data

May 11, 1976 United Kingdom ............ 19343/76

[51] Int. Cl.² ............................................ G01N 19/08
[52] U.S. Cl. ................................. 73/432 R; 33/178 E
[58] Field of Search ................... 73/432 R; 33/125 R, 33/178 E, 178 F

[56] References Cited

U.S. PATENT DOCUMENTS

| 2,607,128 | 8/1952 | Newhall | 33/178 E |
| 3,303,572 | 2/1967 | Vreeland, Jr. | 33/178 E |

FOREIGN PATENT DOCUMENTS 841,718  2/1939  France .............................. 33/178 E Primary Examiner—Richard C. Queisser
Assistant Examiner—Joseph W. Roskos
Attorney, Agent, or Firm—H. Roger Hart; Arthur Schwartz

[57] ABSTRACT

A device for detecting dents or out of round conditions of a buried pipeline, intended to be towed by a pipeline pig, comprises two concentric annular rings, the outer ring sized to accurately fit the inner diameter of the pipeline to be inspected and having electrical contacts on its inner surface, the inner ring is supported concentric with the outer ring by chains, cables or the like and has electrical contacts on its outer surface to complete an electric circuit when the outer ring is deformed radially inwardly as it passes by a dent.

13 Claims, 2 Drawing Figures

PIPELINE LIMIT DENT DETECTOR

This invention relates to a method and apparatus for detecting dents, buckles, ripples or other out-of-round conditions in pipelines used to transport natural gas petroleum products and the like. It is well known to use extended pipelines for carrying natural gas, oils and other fluids over long distances. Such pipelines are normally of a diameter exceeding 12 inches and may be as large as 48 inches or even larger. Generally, such pipeline is installed in a trench and is manufactured by welding together sections of pipe. As the pipe is welded together the entire pipeline is lowered into the trench which has been dug for the pipeline. The trench is then filled in. Once buried, the pipeline is not easily available for inspection purposes.

It is known that such buried pipelines may be inspected by passing along the length of a pipeline an instrument known as a pig. The pig may be equipped with sophisticated devices to detect metallurgical anomalies in the pipeline wall as may be caused by corrosion, or cold working of the metal (for example). Some considerably less sophisticated pigs are used simply to separate fluids such as when different grades of oil may be passed along a pipeline. In addition, pigs are used to keep the line clear as by scouring the inside of the line as the pig moves through the line. This invention is intended to be used in association with the more sophisticated type of pig which is used to inspect various conditions of the pipeline.

During the course of installing a pipeline in its trench occasionally the pipe is dropped or in other ways mishandled in such a manner that the pipe develops a localized out of round condition or a simple dent. In this description, the word 'dent' is to be interpreted to include other out-of-round conditions such as ovalling, buckling, rippling when a dimensional change occurs in the internal diameter of the pipe from the original specification. Minor dents will not effect the metallurgical characteristics of the pipeline wall in such a way as to be dangerous. However, in high pressure gas transmission lines a dent having a depth of in excess of 2 percent of the pipeline diameter may well be sufficient to render the pipe non-acceptable. Various inspection pigs may detect this metallurgical condition of the pipe but will not identify it as being either a dent, a relatively minor scrape or corrosion, etc. Thus, it would be advantageous to have a device whereby dents could be identified.

According to this invention a known pipeline pig equipped with a recording means and the device to be described hereinafter is passed through the pipeline along with the pig. Whenever a dent exceeding a predetermined limit is encountered an electrical signal is created which is recorded by the recording means carried within the pipeline pig. Thus, when the pig is recovered at the end of its run in the known pig trap the recording may be examined and in conjunction with other information recorded thereon objectionable dents can be identified.

Measuring the extent of deformation of a pipe from inside represents a particularly difficult problem since there is usually no point of reference from which to measure. According to the known are caliper pigs have been developed. Such devices operate by monitoring the distance between a point on the pig and the outer edge of the conventional scraper cup which is mounted on the pig. However, such pigs give inaccurate results for the following reasons: (a) light weight pigs may move up and down within the pipe as they travel along when propelled by gas pressure (b) scraper cups which are normally mounted upon such pigs to convey the pig through the pipeline are subject to wear especially at the lower edge and such wear would effect the measurement by allowing the longitudinal axis of the pig body to be below the logitudinal axis of the pipe (c) the front scraper cup is usually used as the propulsion means and there is a pressure differential across the cup. Any clearance at the top of the cup will allow gas to blow by the cup, thus forcing the body of the pig into a tilted position which may vary as the pig moves along the length of the pipeline.

According to this invention there is provided a device comprising two concentric annular members or rings, one radially inside the other. The outer annular member is manufactured of a resilient material and is relatively easily deformable in the radial direction. The outer diameter of this outer member is sized to accurately fit the internal diameter of the pipe to be inspected. The inner member is also manufactured of a resilient material but is less easily deformable than the outer member. The inner surface of the outer ring and the outer surface of the inner ring are equipped with cooperating electrical contact points or strips. The inner ring is suspended from the outer ring by a series of members or material which will not transfer compression forces. Thus, when a dent is encountered the outer ring will deform radially inward toward the inner ring until the electrical contacts or strips of the two rings are in contact. The contact thus made completes an electrical circuit which creates a signal which is recorded by the recording means.

Figure 2:
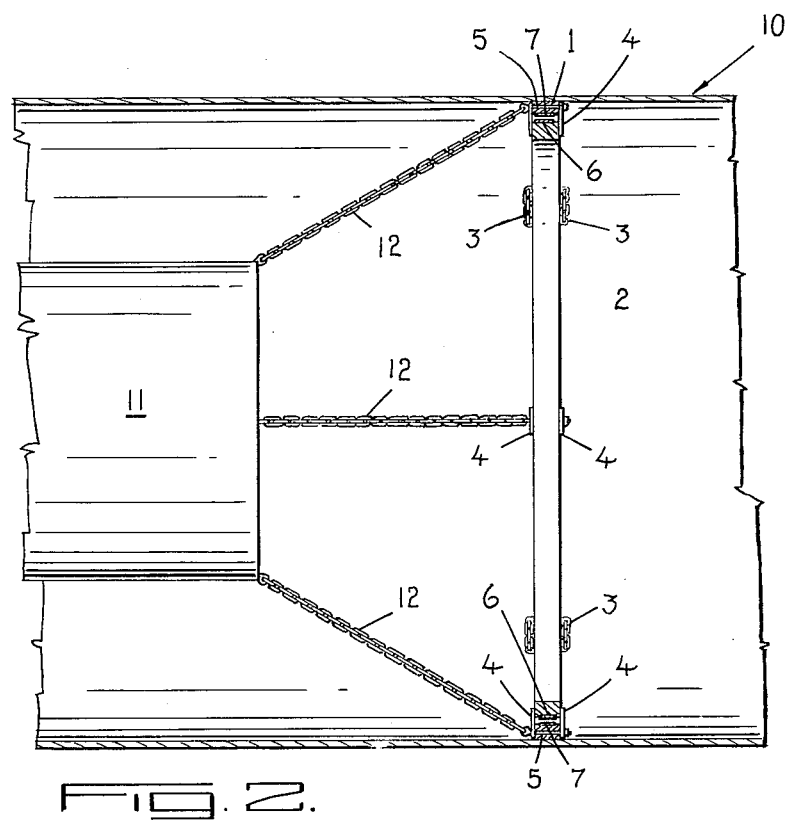

The invention will now be described more fully in association with FIG. 1, which illustrates a view of a preferred embodiment of the invention, in a plane perpendicular to the imaginary longitudinal axis of the pipe through which the device is to be passed; and FIG. 2 is a vertical section along lines A-A of FIG. 1.

The device comprises an outer ring 1 which is sized accurately to fit the internal diameter of the pipe 10 to be inspected. This outer ring is fastened to the body of a pig 11 usually at the rear by a mechanical fastening that allows the device to be pulled by the pig such that the device remains normal to the longitudinal axis of the pipeline. Such mechanical fastening may include three or more evenly spaced light chains 12 or a slotted rigid member or members that have a hinge arrangement. Such mechanical fastening should ensure that the outer ring is independent of up and down movement of the back end of the pig body. In the device shown in the drawings, four light chains 12 are shown.

Inside the outer ring 1 there is an inner ring 2 supported by three or more light chains 3 or equivalent, the inner ring 2 being centred within the outer ring 1, such that there is a uniform radial gap between the two rings. It is normally expected that the light chains will be three or more in number equally distributed around the circumference of the two rings. In the device shown in the drawings, four light chains 3 are shown. It should be noted that the centre of inner ring 2 is completely empty in order that the pressure within the pipeline will not effect the operation of the device.

The width of the uniform radial gap is chosen on the basis of the minimum size of the dent desired to be detected by the device. Assuming that the minimum unacceptable limit of a dent is 2 percent, with a 30 inch pipe the gap would be 0.6 inches. With a uniform radial gap of 0.6 inches the presence of dents not equal to or exceeding this amount will not be detected. The presence of dents equal to or exceeding this amount will be detected as hereinafter explained.

The outer ring 1 is provided with several flat plates 4 mounted rigidly to each side of outer ring 1 as by bolts 5. Plates 4 extend radially inwardly to engage the front and rear surfaces of inner ring 2 such that the inner ring 2 may not move axially along the pipe relative to outer ring 1. It is to be noted that inner ring 2 is not fixed to plates 4 which server only to limit relative axial movement of the inner and outer rings.

There are a series of electrical contacts 6 around the entire inner circumference of outer ring 1 and a series of cooperating electrical contacts 7 around the outer circumference of inner ring 2. These contacts may be either cooperating point contacts or a continuous strip of conducting metal or a combination of the two. Point contacts are preferred in that they could be adjusted for spacing or replaced if worn.

The space between the two rings is advantageously sealed by flexible fabric such as neoprene coated cotton. In addition to keeping dirt away from the contact surfaces, this fabric together with the inner and outer annular rings forms a complete enclosure which may be filled with an inert liquid such as Varsol. This liquid will then allow the device to be used in an oil line operating under main line pressure. It also eliminates any hazard from use in a gas line due to possible arcing of the contacts. The energy level applied to such contacts is also kept low so that the hazard would not normally exist.

The material used for the outer ring must be selected such that the outer ring is quite flexible radially, so that it will readily deform as the ring encounters the dents as the device is moved axially along the pipe. The material for the inner ring must also be carefully selected since it must have less flexibility than the outer ring so that a firm contact can be established between the rings when encountering a dent, but it must still have some flexibility so that both rings can continue to flex when the dent exceeds the 2 percent limit previously referred to. An alternative is to use the same flexible material for both inner and outer rings. If the same material is used for both rings the inner ring may be made with a greater radial thickness than the outer ring thereby making the inner ring more stiff than the outer ring. It has been found that an acceptable device according to this invention can be made using an outer ring of polyurethane having a radial thickness of approximately 1 ¼ inches and an inner ring of polyurethane having a radial thickness of approximately 3 inches.

A suitable electrical circuit which is not illustrated will be readily known to those skilled in the art. The pig body which is equipped with battery power and recording means will provide the power source. A simple two wire circuit leading to the contact strips 6 and 7 may be used.

In order to ensure that the rings are deformable only in a radial direction and not in an axial direction, the rings may be of a substantial thickness in the transverse direction. Such a thickness limitation will prevent the outer ring from bending or deforming in a direction parallel to the axis of the pipeline through which the device is being towed. An acceptable device according to this invention has been manufactured with rings having a thickness in the order of 1 ½ inches.

In operation, the outer ring will deform as it passes by the dent. If the dent is deeper than the radial gap between the two contact strips 6 and 7, a portion of the contact strip 6 on the inner surface of ring 1 will touch the cooperating contact area 7 on the inner ring 2, thereby completing an electrical circuit. When contact is established between the electrical contacts 6 and 7 the electric circuit is completed creating a signal which may be recorded by the recorder carried within the pig. This signal will continue and may be recorded for the duration of the contact. It will be seen that such a recorded signal may be used to establish the linear distance along the pipe over which the dent exceeds the gap. If single contact strips 6 and 7 are used, the device will not determine the radial location of the dent. If it is desired to determine the radial location of the dent segmented contact strips could be used. If segmented contacts are used each set of contacts could be separately recorded to determine the radial location of the dent. If desired, multiple measurements may be made by using multiple sets of rings as described herein. Such multiple sets having different gaps could be used to identify dents of greater or less depth.

What I claim is:

1. A device for detecting dents in pipe comprising:
   a first annular member having an outside diameter equal to the inner diameter of the pipe to be inspected;
   a second annular member having an outside diameter less than the inner diameter of said first member;
   means for locating said second member concentric with said first member and means for maintaining said first and second members in substantially the same plane;
   said first member having an electric contact;
   said second member having an electric contact for cooperation with said electric contact on said first member when said first member is radially deformed inwardly toward said second member;
   said first member being more readily radially deformable than said second member.

2. The device of claim 1, where said second member is spaced from said first member by a radial gap of uniform width.

3. The device of claim 2, in which said electric contacts on said first members are located on an inner surface of said first member and said electric contacts on said second member are located on an outer surface of said second member.

4. The device of claim 3 in which the electric contact on said first annular member comprises a continuous strip.

5. The device of claim 3 wherein said electric contacts on said first member and on said second member are enclosed by flexible means which permits electrical contact between said contacts on said first and second members, which flexible means are impervious to ambient fluid within said pipe.

6. The device of claim 3 in which the electric contact on said first annular member comprises a series of discrete contact points.

7. In combination a device of claim 3 and a pipeline pig, said pig carrying battery means and recording means to record incidences of said electric contacts on said first member contacting said electric contacts on said second member.

8. The device of claim 2 wherein said electric contacts on said first member and on said second member are enclosed by flexible means which permits electrical contact between said contacts on said first and second members, which flexible means are impervious to ambient fluid within said pipe.

9. In combination a device of claim 8 and a pipeline pig, said pig carrying battery means and recording means to record incidences of said electric contacts on said first member contacting said electric contacts on said second member; means attaching said device to said pig to permit said pig to pull said device along said pipe such that said device remains substantially perpendicular to the longitudinal axis of said pipe.

10. The device of claim 2, in which said gap is equal to 2 percent of the inner diameter of said pipe.

11. The device of claim 2 in which the electric contact on said first annular member comprises a series of discrete contact points.

12. In combination a device of claim 2 and a pipeline pig, said pig carrying battery means and recording means to record incidences of said electric contacts on said first member contacting said electric contacts on said second member.

13. In combination a device of claim 2 and a pipeline pig, said pig carrying battery means and recording means to record incidences of said electric contacts on said first member contacting said electric contacts on said second member; means attaching said device to said pig to permit said pig to pull said device along said pipe such that said device remains substantially perpendicular to the longitudinal axis of said pipe.

* * * * *